Figure 6:
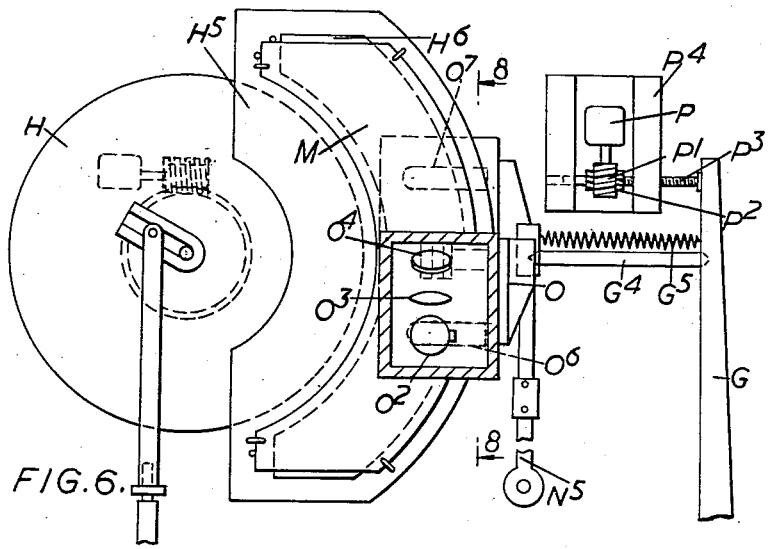

March 5, 1963 G. O. RAWSTRON ET AL 3,079,731
GENERATION OF SHAPED SURFACES
Filed Feb. 16, 1960 3 Sheets-Sheet 1
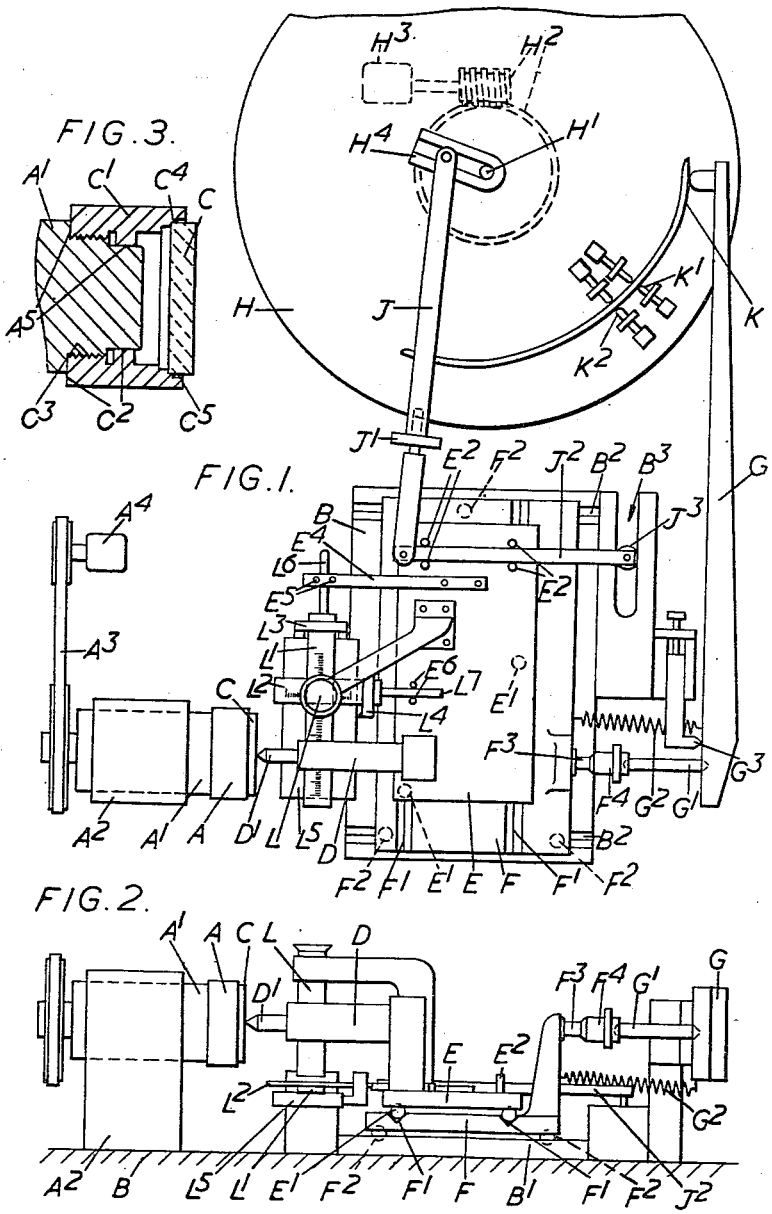
Inventors
G. O. Rawstron
A. E. Reason
By
Attorneys

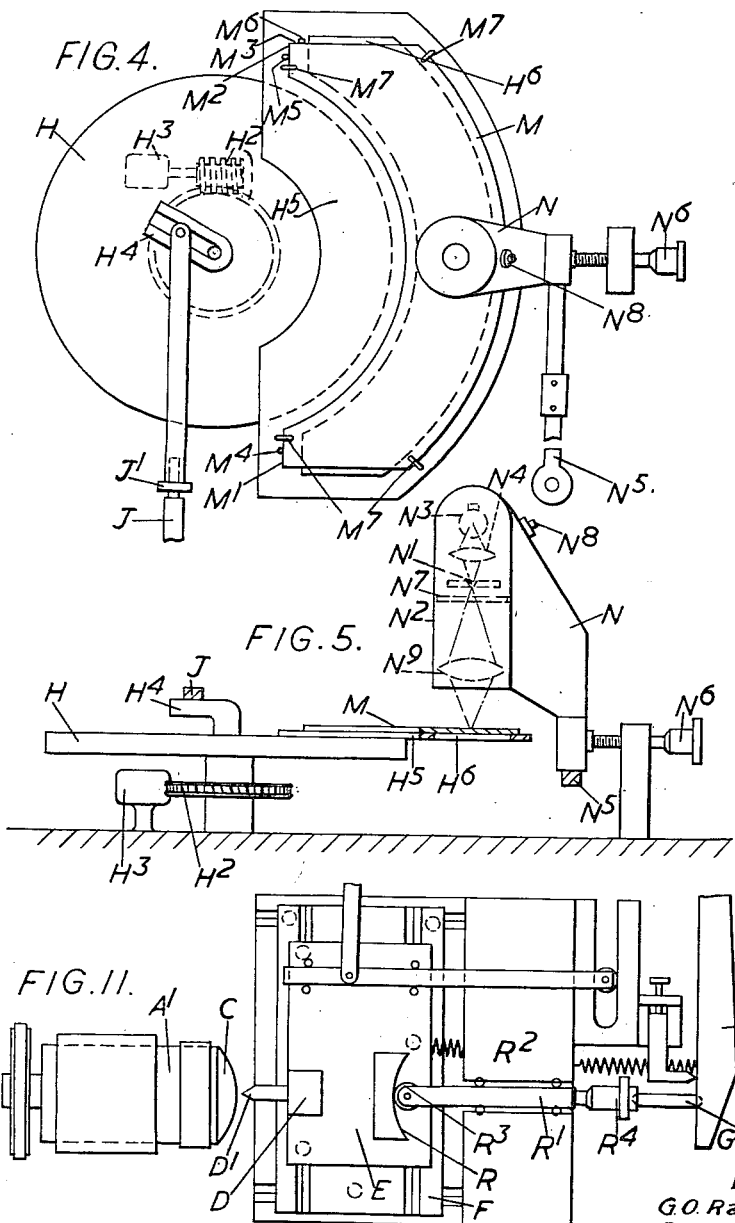

United States Patent Office 3,079,731
Patented Mar. 5, 1963

3,079,731
GENERATION OF SHAPED SURFACES
George Ormerod Rawstron and Richard Edmund Reason, Leicester, England, assignors to Rank Precision Industries Limited trading as Taylor, Taylor & Hobson, Leicester, England, a company of Great Britain
Filed Feb. 16, 1960, Ser. No. 9,087
Claims priority, application Great Britain Feb. 18, 1959
14 Claims. (Cl. 51—58)

This invention relates to apparatus for producing on a workpiece a surface of revolution which deviates from a basic surface by relatively small amounts at different radial distances from the axis of symmetry. Although not limited thereto, the invention is more especially intended for the generation of what are sometimes known as "figured" surfaces on optical elements, for such surfaces have hitherto been formed by first producing a rough approximation to the desired surface, for example by moulding or by a lapping process, and then finishing the surface by a laborious "figuring" process which calls for highly expert skill and involves repeated optical testing between hand rubbing operations until the desired surface has been formed with a sufficient degree of accuracy. The basic surface may be a plane surface, and in such case the invention is suitable, for example, for the production of the optical correcting plates known as Schmidt plates. Alternatively, the basic surface may be a spherical surface, and there are many known instances in the optical objective art in which use is made of aspheric lens surfaces which deviate by only small amounts from a basic spherical surface.

The present invention has for its object to provide a simple and efficient apparatus for generating such surfaces whereby the surface is initially formed with so high a degree of accuracy as to render unnecessary the expert figuring process hitherto required.

In the apparatus according to the present invention, the workpiece is roatated about its axis of symmetry, and interrelated relative movements between the workpiece and the tool are effected in two coordinate directions respectively parallel to and at right angles to a fixed reference axis, which coincides with the axis of symmetry in at least one position of such axis, the relationship between such coordinate measurements being dependent upon the shape of the basic surface and being controlled in accordance with the deviations of the desired surface from such basic surface.

The basic surface may consist of a plane surface at right angles to the axis of symmetry, and in such case, preferably, a relative traversing movement between the workpiece and the tool is effected in a direction at right angles to the axis of symmetry, and a relative correcting movement controlled in accordance with the deviations of the desired surface from the basic plane surface at the various radial distances from the axis of symmetry is effected in a direction parallel to the axis of symmetry.

Alternatively, the basic surface may consist of a spherical surface centered on the axis of symmetry, and in such case, preferably, a relative movement controlled in accordance with the shape of the basic surface is superimposed on a relative correcting movement controlled in accordance with the deviations from the basic surface to determine the relationship between the coordinate relative movements. Conveniently, the control in accordance with the shape of the basic spherical surface is effected by relatively guiding the two coordinate movements along a circular path. The relative correcting movement in accordance with the deviations from the basic spherical surface may be effected in a direction parallel to the fixed reference axis, whereby the superimposed relative movements are interrelated in accordance with a system of combined polar and rectangular coordinates generated by rectangular coordinate relative movements.

The relative correcting movement is preferably controlled by a cam device shaped in accordance with the deviations of the desired surface from the basic surface, whether such basic surface be plane or spherical. Preferably, the shape of the cam device is determined in accordance with a chosen large multiple of the deviations, and the correcting movement is derived therefrom through a transmission mechanism having a reduction ratio dependent on such chosen multiple, means being provided for effecting relative movement between the cam device and the transmission mechanism in accordance with the relative traversing movement.

Whilst other forms of cam device may be used, it is preferred to employ an optical cam device comprising a sheet bearing a curved line which contrasts in respect of light-transmitting properties with the background constituted by the adjacent portions of the sheet, the relative correcting movement being derived from relative movement between such cam device and an optical unit for following the curved line on the sheet. Such optical unit may act to direct a small beam of light through the optical cam device on to photoelectric means sensitive to lateral displacement between the beam of light and the curved line on the sheet, electrical means being provided operative in accordance with the output of the photoelectric means to effect relative movement between the optical unit and the cam device for correcting such lateral displacement. The relative movement between the cam device and the optical unit is preferably effected by a reversible electric motor whose direction of rotation is controlled by the photoelectric means, whereby such relative movement consists of small oscillations from one side to the other of the correct relative position determined by the cam device.

Figure 7:
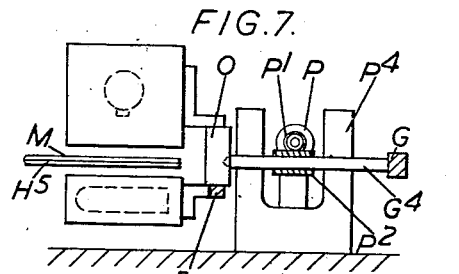
Figure 8:
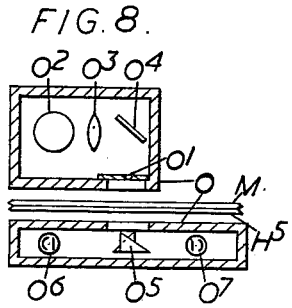
Figure 9:
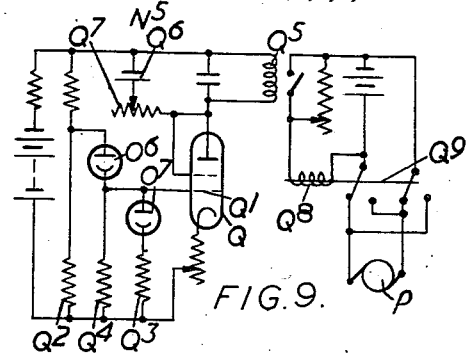
Figure 10:
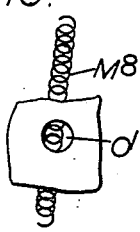

The invention may be carried into practice in various ways, but some convenient alternative practical arrangements according thereto for accurately generating a surface of revolution deviating by relatively small amounts from a basic plane or spherical surface, for example the surface of a lens or other optical element, are illustrated somewhat diagrammatically in the accompanying drawings, in which FIGURE 1 is a plan view of one arrangement in which the basic surface is a plane surface, FIGURE 2 is a front view of the arrangement of FIGURE 1, FIGURE 3 is a sectional view of the workholder used in the arrangement of FIGURES 1 and 2, FIGURES 4 and 5 are partial plan and front views illustrating apparatus for generating a cam device, for use in an alternative arrangement, FIGURE 6 illustrates in plan view the alternative arrangement employing the cam device of FIGURES 4 and 5, FIGURE 7 is a front view of the arrangement of FIGURE 6, FIGURE 8 is a sectional view on the line 8—8 of FIGURE 6, FIGURE 9 is a diagram of an electric circuit used in the arrangement of FIGURES 6–8, FIGURE 10 is a fragmentary view illustrating the form of cam device used in the arrangement of FIGURES 6–8, and FIGURE 11 illustrates a modified arrangement for use when the basic surface consists of a spherical surface.

In the arrangement of FIGURES 1 and 2, in which the basic surface is a plane surface at right angles to the axis of symmetry of the desired surface, which may for instance be the surface of a correcting plate of the Schmidt type, the workholder consists of a fitting A on the end of an accurate spindle $A^1$ journalled horizontally in a housing $A^2$ secured to a fixed base B, the spindle being driven through suitable coupling means $A^3$ by an electric motor $A^4$. The spindle $A^1$ is so mounted in its housing as to be substantially wholly devoid of any shake in its rotation, for example in one or other of the ways described in United States Patent No. 2,701,170. It is likewise important to ensure that the workpiece C is accurately centered on the axis of the spindle $A^1$. In the case of a Schmidt plate, the workpiece C will usually consist of a circular disc of glass carried in a cell. To ensure accuracy of mounting on the spindle, the cell $C^1$ is provided (as shown in FIGURE 3) with accurately ground locating faces $C^2$ which cooperate with complementary faces $A^5$ provided on the end of the spindle $A^1$, the cell being secured on a loose screwthread $C^3$ so as to clamp such faces in engagement. The cell $C^1$ likewise has accurate seating faces $C^4$ for receiving the glass disc C which will usually be held against such faces by wax in recesses $C^5$.

The toolholder D is secured to a cross slide E which can slide for example on three bearing balls $E^1$ on guide tracks $F^1$ on a carriage F, which in turn can slide similarly on balls $F^2$ on guide tracks $B^2$ on a fixed base slab $B^1$. The two sets of guide tracks $F^1$ and $B^2$ lie accurately at right angles to one another, those on the base slab $B^1$ being accurately parallel to the axis of the horizontal spindle $A^1$ carrying the workholder A. The carriage F is moved along its guide tracks $B^2$ by a lever G through a connecting rod $G^1$ having rounded ends abutting respectively against the lever G and against a projection $F^3$ from the carriage F having a micrometer fitting $F^4$ for fine adjustment of the axial position of the carriage relatively to the lever, a spring $G^2$ being provided between the lever and the carriage to hold the parts in engagement.

The lever G is driven at its other end in accordance with the deviations of the desired surface from the basic plane surface under the control of a cam device carried by a horizontal table H mounted on a vertical spindle $H^1$ driven through worm gearing $H^2$ by another electric motor $H^3$. This spindle $H^1$ carries a crank arm $H^4$ to which one end of a connecting rod J is adjustably connected, the other end of such connecting rod being employed to drive the cross-slide E on its guide tracks $F^1$ across the carriage F. A micrometer fitting $J^1$ is provided for adjusting the effective length of the connecting rod J. In order to avoid errors in the drive of the cross-slide E due to varying inclination of the connecting rod J, this rod is not connected directly to the cross-slide, but to a bar $J^2$ which extends parallel to the axis of the horizontal spindle $A^1$ and engages between two pairs of rollers $E^2$ on the cross-slide E, the bar $J^2$ being constrained against longitudinal movement by means of a roller $J^3$ engaging in a fixed slot $B^3$ extending at right angles to the direction of the horizontal spindle axis.

The cam device may be arranged in various ways, but in one simple form consists of a flexible steel strip K clamped at a large number of closely spaced points, such as $K^1$, $K^2$, along its length to the horizontal table H. These clamps $K^1$, $K^2$ .... are spaced approximately round an arc of a circle centered on the vertical spindle $H^1$ and can be accurately adjusted radially with respect thereto to give the desired cam shape. These adjustments are made in accordance with calculated measurements defining the deviations of the desired surface from the basic plane surface. When, as will usually be the case with a Schmidt plate, these deviations are very small, the actual cam shape is preferably determined in accordance with a chosen large multiple of the deviations, for example two hundred times the calculated deviations, the lever G being arranged to give a 200:1 reduction ratio, to provide the correct deviations in the actual movement of the carriage F. The lever pivot $G^3$ is preferably adjustable to enable the reduction ratio to be varied, as may be convenient.

For the purpose of setting the cam K in accordance with the calculated measurements of the deviations, the cross-slide E carries a microscope L for viewing a pair of crossed accurately divided movable glass scales $L^1$, $L^2$, one of which $L^1$ extends transversely to the axis of the horizontal spindle $A^1$ and the other $L^2$ parallel thereto. These scales $L^1$, $L^2$ each move at right angles to their lengths and are guided in their movements by means of projections $L^3$, $L^4$ spring-pressed against the accurately polished edges of a rectangular glass reference plate $L^5$ secured to the base. The transverse scale $L^1$ is moved in the axial direction by means of a projection $E^4$ on the cross-slide E carrying a pair of rollers $E^5$ between which a rod $L^6$ carried by the scale $L^1$ engages. The axial scale $L^2$ is similarly moved in the transverse direction by means of a pair of rollers $E^6$ on the cross-slide E between which a rod $L^7$ carried by the scale $L^2$ engages. The microscope L is so positioned as to be sighted on the point of intersection of the two scales $L^1$, $L^2$, and it will be clear that it will remain sighted thereon in all positions of the cross-slide E, as the scales move relatively to one another.

The transverse scale $L^1$ is finely divided into equally spaced graduations appropriate to the radial positions at which the measurements of the deviations of the desired surface from the axis of symmetry are calculated, the zero point of the scale being so positioned that when it is in the centre of the field of the microscope L, the cross-slide E is in the correct position for the tool $D^1$ to be accurately aligned on the horizontal spindle axis. The axial scale $L^2$ is similarly graduated and in order to get highly accurate sub-divisions of the scale divisions, the microscope L is provided with an adjustable vernier graticule.

In use, for setting the cam K in accordance with the calculated measurements for an individual Schmidt plate, the connecting rod J for driving the cross-slide E is first adjusted along the crank arm $H^4$ on the vertical spindle $H^1$ to give a suitable relationship between the angular rotation of the horizontal table H and the transverse movements of the cross-slide E for an adequate length of cam in relation to the maximum radius of the desired Schmidt plate, the total angular movement of the crank arm $H^1$ over the whole length of cam K being not greater than about 120 degrees, with the beginning and end positions more or less equally spaced on either side of a radial line from the vertical spindle axis parallel to the horizontal spindle axis. The length of the connecting rod J is correspondingly adjusted to give the desired relationship between the zero points of the transverse scale $L^1$ and of the crank arm $H^4$. The lever ratio is also chosen to suit the magnitude of the deviation calculations, the lever pivot $G^3$ being suitably adjusted.

The cam strip K is now clamped in position on the horizontal table H starting with the zero point, the table being rotated and with it the cross-slide E moved step by step in accordance with the graduations on the transverse scale $L^1$ viewed through the microscope L, the cam clamps $K^1$, $K^2$ .... being adjusted one by one to the correct positions to suit the chosen multiple of the deviations, as determined by the calculated deviation measurements on the axial scale $L^2$ viewed through the microscope L with the aid of the vernier graticule, the movements of the carriage F corresponding to such measurements being transmitted to the cam K through the lever G to determine the cam positions for clamping. When the cam K has been accurately clamped in its correct position throughout, the tool $D^1$ is inserted in the toolholder D in its correct position and the cross-slide E is moved so that the tool lies just off the edge of the workpiece disc C, the micrometer fitting $F^4$ on the projection $F^3$ from the carriage F being adjusted to move the tool $D^1$ axially to the position corresponding to the desired depth of cut on the disc. Whilst a sharply pointed diamond tool is usually preferable, it may be practicable in some instances to employ a driven diamond wheel, preferably using the relatively sharp edge thereof.

The apparatus is now ready for the actual generation of the Schmidt plate surface on the disc C, and the two electric motors $A^4$, $H^3$ are started up respectively to drive the horizontal spindle $A^1$ and to traverse the cross-slide E at the appropriate speed across the disc C from the edge to the centre. As this traversing proceeds, the lever G, which engages with the cam K in a substantially radial direction relatively to the vertical spindle $H^1$, is moved by the cam K so as to transmit to the carriage F the correct deviations, thereby ensuring accurate generation of the desired surface on the disc C.

This arrangement may be modified by dispensing with the axial scale $L^2$ altogether and providing a micrometer to measure directly the chosen multiple of the calculated deviation measurements for setting the cam K in position, the micrometer measurements being effected in a radial direction with respect to the vertical spindle $H^1$, in the position in which the end of the lever G engages with the cam K. Such modification will be described below with reference to FIGURES 4 and 5.

In the foregoing arrangement the cam device is in the form of a thin flexible steel strip K, but it is usually preferable in practice to employ an optical cam device consisting of a dark or opaque line on a translucent sheet or a translucent line on a dark or opaque sheet in conjunction with an optical follower unit. It is especially convenient to employ the arrangement forming the subject of the present applicants' copending United States patent application Serial No. 857,816, now abandoned, wherein such line is made up of a series of small dots at equal intervals, in the positions defined by the calculated measurements, the dots preferably being of such a size in relation to the intervals between dots that they overlap one another and form a continuous line, the actual cam line consisting of the line of centres of the dots.

Such optical cam device can be manufactured in various ways, but it is preferred to make it photographically in the manner forming the subject of the present applicants' United States patent application Serial No. 857,-817. For this purpose, as shown in FIGURES 4 and 5, an unexposed sensitive photographic plate M is mounted on a projection $H^5$ from the horizontal table H, such projection being provided with an arcuate slot $H^6$ (for a purpose to be described below) over which the plate M rests. The plate is provided with two accurately ground surfaces $M^1$, $M^2$ on one of its longer edges and a third ground surface $M^3$ on one of its end edges, these three ground surfaces $M^1$, $M^2$, $M^3$ engaging with three locating pins $M^4$, $M^5$, $M^6$ on the projection $H^5$ from the table H, whereby it can be positioned with accuracy thereon. Clamps $M^7$ are provided to hold the plate M in the position determined by the locating pins.

A photographic unit N, comprising a small aperture $N^1$ within a closed casing $N^2$ which also houses a source of light $N^3$, a condensing lens $N^4$ for concentrating the light on the aperture $N^1$ and an objective $N^9$ for focussing the aperture $N^1$ on the photographic plate M, is movably mounted so that the vertical optical axis of the beam of light passing through the aperture $N^1$ can move in a substantially radial direction with respect to the vertical axis of the horizontal table H. Since, however, its total movement is quite small, it will suffice for it to be mounted on the end of a long pivoted arm $N^5$. The movements of the unit N are controlled by a micrometer head $N^6$, whereby such movements can be effected with a high degree of accuracy in accordance with calculated measurements. A shutter $N^7$ is provided in the casing of the photographic unit N, so as normally to shut off the light from the aperture $N^1$, this shutter being operated, for example by a press button $N^8$ on the casing, to permit the light to pass from the aperture $N^1$, when desired.

This device is operated in a manner generally analogous to that above described for the setting of the steel strip cam K. Thus the table H bearing the photographic plate M is rotated step by step through a number of closely spaced positions accurately determined by observing the graduations on the transverse scale $L^1$ through the microscope L. In each position, the micrometer head $N^6$ is operated in accordance with the appropriate calculated measurement, and when the photographic unit N has thus been positioned the shutter $N^7$ is opened to expose the small circular portion of the sensitive photographic plate M on which the light from the aperture $N^1$ is focussed, thus recording one of the desired round dots on the plate. It should be mentioned that an opaque screen (not shown) is provided to minimise risk of fogging the sensitive plate M by the light used for viewing the scale $L^1$ and setting the micrometer head $N^6$, the plate M itself being slow in order still further to minimise the risk of fogging.

When all the dots have been recorded, the sensitive plate M is removed and developed, to produce a photographic negative on which a curved line of dark or opaque round dots $M^8$ (FIGURE 10) appears on a translucent background, such line of dots being shaped in accordance with the calculated deviations of the desired Schmidt plate surface from the basic plane surface. Such photographic negative M is preferably itself used to constitute the optical cam device, but it will be clear that, if it is preferred to use a cam device with translucent dots on a dark or opaque background, the negative may be photographically printed on to another precisely similar plate (likewise provided with the three ground portions on its edges) to form a photographic positive, which can be used as the optical cam device. The plate (whether negative or positive) is then replaced in position on the projection $H^5$ from the horizontal table H against the locating pins $M^4$, $M^5$, $M^6$, so that it will occupy exactly the same position as before. The photographic unit N is now removed from the long pivoted arm $N^5$, to be replaced by the optical follower unit, which cooperates with the optical cam device in practical use.

Such optical follower unit O (see FIGURES 6, 7 and 8) also includes a small circular aperture $O^1$, a source of light $O^2$ and a lens system $O^3$ for directing a vertical concentrated beam of light from the source $O^2$ through the aperture $O^1$. If the photographic negative is used as the cam device, this aperture $O^1$ is made larger than that $N^1$ used during photographing, for example having twice the diameter thereof. Although the source of light $O^2$ and the lens system $O^3$ may be mounted vertically above the aperture $O^1$, it is found more convenient, for reasons of compactness, for the light and lens system to have a horizontal axis, a small mirror $O^4$ inclined at 45 degrees to such axis being provided to deflect the beam vertically down through the aperture $O^1$. The follower unit O also includes a beam-splitting device $O^5$, lying vertically beneath the aperture $O^1$ with the optical cam device M between them, the arcuate slot $H^6$ in the projection $H^5$ from the horizontal table H thus serving to permit the beam of light through the aperture $O^1$ to pass through the optical cam device to the beam-splitting device $O^5$, which acts to deflect two parts of the beam respectively on to two photoelectric cells $O^6$, $O^7$, also carried by the follower unit O. The operative beam-splitting plane of the beam-splitting device $O^5$ extends tangentially with respect to the vertical axis of the horizontal table H. Whilst the beam-splitting device $O^5$ may consist of an ordinary beam-splitting prism with its operative edge tangential with respect to such vertical axis, so that the two partial beams to the two photocells pass radially, inwards and outwards, with respect to such axis, it is found more convenient to use a different form of beam-splitting device, which will deflect the two partial beams in opposite directions parallel to the beam-splitting plane. This consists (as shown in FIGURE 8) of two similar reflecting prisms side by side with their inclined reflecting surfaces facing in opposite directions, the prism sides in contact with one another lying in the beam-splitting plane.

The follower unit O is mounted on the long pivoted arm $N^5$, which previously carried the photographic unit N, care being taken to ensure that its small aperture $O^1$ follows the same substantially radial path with respect to the vertical axis of the horizontal table H as the aperture $N^1$ of the photographic unit N. The follower unit O is connected to the lever G, which operates the tool-holder D, through a connecting link $G^4$ having ball ends engaging in recesses in the follower unit O and in the lever G, a spring $G^5$ being provided to maintain the parts in engagement.

The two photocells $O^6$, $O^7$ are connected in a suitable electrical circuit (which may for instance take the form described in the specification of the copending application Serial No. 857,816, now abandoned, above mentioned) to control the operation of a reversible electric motor P, the arrangement being such that when the output of the first photocell $O^6$ exceeds that of the second $O^7$ the motor P is driven in one direction, whilst when the output of the second photocell $O^7$ exceeds that of the first $O^6$ the motor P is driven in the opposite direction. This motor P drives a worm $P^1$ engaging with a worm wheel $P^2$ on a rod $P^3$ which is in screwthreaded engagement with a fixed bracket $P^4$, so that the rod $P^3$ will move longitudinally in one direction or the other in accordance with the direction of rotation of the motor P. The rounded end of this rod engages either with the follower unit O itself or (as shown) with the lever G connected thereto.

Thus, when the horizontal table H is rotated to drive the optical cam device slowly past the small aperture $O^1$ of the follower unit O, the beam of light through the aperture will pass through a small circular patch of the cam device, across the middle of which the line of dots $M^8$ passes. The light passing through the portion of such circular patch on one side of the line of dots $M_8$ passes to one photocell $O^6$, and that through the portion on the other side of the line of dots passes to the other photocell $O^7$. If the line of dots $M^8$ is not exactly central in the small circular patch, more light will pass to one photocell than to the other, with the result that the electric motor P will be caused to rotate so as to move the follower unit O in the direction to equalise the two portions of the circular patch on the two sides of the line of dots $M^8$. The follower unit O will in fact move past the position of equality, as the result of which the outputs of the two photocells $O^6$, $O^7$ will be caused to differ in the opposite sense and will thereby cause the motor P to be reversed, thus bringing the follower unit O back again. The follower unit will therefore be caused to oscillate backwards and forwards from one side to the other of its correct position as determined by the line of dots $M^8$. These oscillations can be made very small with suitable design of the electric circuit, but they will ensure highly sensitive following of the curve of the line of dots, and therefore highly accurate control of the movement of the tool $D^1$ for the generation of the desired surface.

A preferred form for such electric circuit is described in the specification of the copending application Serial No. 857,817 above mentioned, but a simplified form of such circuit is shown by way of example in FIGURE 9. This circuit includes an electronic valve Q, the potential of the grid $Q^1$ of which is controlled by a circuit resembling a bridge circuit, having the two photocells $O^6$ and $O^7$ in two of its arms. The other two arms contain resistances $Q^2$, $Q^3$ and a further resistance $Q^4$ is connected across the diagonal of the bridge. The arrangement is such that, when the photocell outputs are balanced, sufficient anode current flows to close a sensitive relay $Q^5$ in the anode circuit of the valve Q. A shunt circuit is connected across the relay $Q^5$ containing an auxiliary bias supply $Q^6$ and a variable resistance $Q^7$, for bringing the relay into a critical operating condition by passing a current in opposition to the anode current of the valve. The contacts of the relay $Q^5$, which open and close in response to variations in the anode current of the valve Q, control the energisation and deenergisation of a contactor $Q^8$ controlling reversing contacts $Q^9$ in the energising circuit of the reversible motor P. In this way, highly sensitive control of the direction of rotation of the motor P by the outputs of the photocells $O^6$, $O^7$ is ensured, thus causing the follower unit O to follow the line of dots $M^8$ with a high degree of accuracy as the traversing proceeds, and thereby in turn causing highly accurate generation of the desired surface on the workpiece C.

It should be mentioned that for satisfactory beam-splitting action, the cam line $M^8$ should not become too steeply inclinde to the operative beam-splitting plane, and it is found that the angle between the cam line and such plane should not be greater than about 30 degrees. In practice, however, this does not present serious difficulty, for a reduced inclination can be used if the lever reduction ratio is reduced. When generating the cam device, therefore, the operator should in general choose as large a reduction ratio (within the available range) as is possible without involving an excessive inclination of the cam line to the beam-splitting plane.

If it is desired to use the photographic positive, instead of the negative, for the optical cam device, the aperture $O^1$ in the optical follower unit should preferably be made of the same size as that used in photographing, and the follower unit should also be provided with a graticule having a fairly thick straight line marking in the path of the light between the aperture $O^1$ and the beam-splitting device $O^5$, such straight line lying in the beam-splitting plane. Thus, as each of the translucent dots of the cam device comes in its turn beneath the aperture $O^1$, any lateral displacement relatively to the beam-splitting plane will be revealed by the different amounts of light passing on the two sides of the graticule line respectively to the two photocells $O^6$, $O^7$.

It should be noted that such straight line graticule will operate satisfactorily for splitting the beam, even if the spacing between consecutive dots in the line is such that the dots do not overlap one another. This makes it practicable, if desired, to manufacture an optical cam device by punching small holes through an opaque sheet in the appropriate accurately measured positions, without unduly weakening the sheet by overlapping consecutive holes and thus producing a continuous cam slot. In a similar way, the straight line graticule can be used with a row of dark or opaque dots on a transulcent background, when such dots do not overlap one another.

Again, it is not essential to use round dots to make up the cam line of the optical cam device, and patches of other shape can be employed, if desired, by the use of an aperture other than circular in the photographic unit N. Round dots, however, are usually preferable, since their use will permit satisfactory operation over a greater range of inclinations of the cam line to the beam-splitting plane than patches of other shape.

The arrangements above described have been concerned with the generation of a surface deviating by small amounts from a basic plane surface, but they can readily be modified to deal with the generation of an aspheric surface deviating by small amounts from a basic spherical surface. For this purpose, it is necessary to employ a relative traversing movement which requires cooperation between the two rectangular coordinate movements to produce a resultant equivalent to a rotation about a pivot axis at a radius equal to that of the basic spherical surface.

This can readily be achieved by modifying the foregoing arrangements (as shown in FIGURE 11) to provide an arcuate guide R on the cross-slide E of radius equal to that of the basic spherical surface, such guide cooperating with an abutment to which the correcting movement derived from the lever G is applied. Thus, the projection from the carriage F against which the connecting rod abutting against the lever cooperates in the foregoing arrangements, is removed and replaced by a member $R^1$ sliding in a ball guide $R^2$ accurately parallel to the axis of the horizontal spindle $A^1$ and terminating in a roller $R^3$ engaging with the arcuate guide R provided on the cross-slide E, the micrometer fitting used for adjustment of the depth of cut still being provided at $R^4$ on this sliding member $R^1$.

The effect of this modification is that the movement of the carriage F is no longer confined to the correcting movement derived through the lever G from the cam device, but now consists of two superimposed movements, one of which is constituted by such correcting movement while the other is a component movement which cooperates with the movement of the cross-slide E on the carriage to produce the desired resultant rotational traversing movement centered about a vertical axis, which intersects the axis of the horizontal spindle $A^1$ and may be termed the "pivot" axis although no actual pivot is provided.

The arcuate guide R is detachably mounted on the cross-slide E, so that it can be replaced by another arcuate guide of different radius, when required, and since it is important to ensure that the guide is centered with a high degree of accuracy on a straight line through the tool $D^1$ parallel to the horizontal spindle axis, it is desirable to provide the mounting for the guide R on the cross-slide E with fine adjustment means (not shown) for tilting the guide to bring its centre into correct alignment with such straight line.

When crossed scales $L^1$, $L^2$ are used, the accuracy of mounting of the arcuate guide R can readily be checked directly against correct readings on the two scales in accordance with calculated measurements.

In order to check the accuracy of mounting of the arcuate guide R, when the transverse scale $L^1$ alone is used in conjunction with a micrometer head $N^6$ at the low magnification end of the lever G, a spherical lens having a surface accurately corresponding to the basic spherical surface is first mounted in a cell on the end of the horizontal spindle $A^1$ (care being taken to clean the lens seatings in the cell thoroughly to avoid positional errors due to dirt), and a precision gauge is fitted into the toolholder D in place of the tool $D^1$ with its movable gauging element projecting into engagement with the spherical surface. The cross-slide E is then moved, so that the arcuate guide R slides past the abutment roller $R^3$, with corresponding axial movement of the carriage F, until the gauging element engages with a marginal point of the spherical surface. With the cross-slide E held stationary in this position, the horizontal spindle $A^1$ is rotated at a slow speed, and the gauge readings are watched during this movement. If, as may be the case, for example because of dirt not properly removed from the cell seatings or due to any untruth in the edging of the lens, the spherical lens has a slight tilt in its mounting, so that its centre is not quite accurately aligned on the spindle axis, this will be revealed by the gauge readings which will vary from a maximum to a minimum and back again during one complete revolution. The position of maximum error is noted and the spindle $A^1$ is rotated through exactly a right angle from such position. This will bring the points of maximum and minimum error vertically above and below the spindle axis, so that the horizontal section of the lens surface through the axis is substantially accurately circular. The spindle $A^1$ is now locked in this position, and the cross-slide E is now operated, so that the gauging element is traversed along this circular section of the surface. The gauge readings during such traverse will indicate whether the arcuate guide R is accurately centered on the spindle axis, the necessary adjustment of the arcuate guide being made to correct any error, so that the gauge readings will remain constant (to the degree of accuracy required) during the traverse. The gauge is now removed from the toolholder D and the tool $D^1$ inserted therein, the tool being adjusted in its holder to the position in which it just touches the spherical surface. The tool is locked in the toolholder in this position of adjustment, and the spherical lens is removed from the horizontal spindle.

The parts are now ready for setting the cam device, whether in the form of a steel strip or of an optical cam device, in the manner above described, in accordance with the chosen multiple of the deviations of the desired aspheric surface from the basic spherical surface. When the cam device has been set and the lever pivot $G^3$ adjusted to suit the chosen ratio, the glass block C on which the aspheric surface is to be generated is mounted in its cell in position on the horizontal spindle, care being taken to remove any dirt from the cell seatings to ensure accurate positioning of the glass block thereon. The cross-slide E is operated to bring the tool $D^1$ just off the edge of the glass block C, and the micrometer fitting $R^4$ between the lever G and the abutment $R^3$ engaging with the arcuate guide R is operated to move the carriage F axially to the position corresponding to the desired depth of cut on the block. The two electric motors $A^4$ and $H^3$ are now started up and the desired aspheric surface is generated on the workpiece in a manner analogous to that above described.

It should be mentioned that, since the correcting movement in accordance with the deviations is applied in a direction parallel to the horizontal spindle axis, in all relative positions of the tool and workpiece, the relative traversing and correcting movements operate on a system of combined polar and rectangular coordinates, and of course the deviations must also have been calculated on this basis. The fact that deviations calculated on this basis were applied to the cam device on a truly polar coordinate basis is immaterial, since the lever G is operated by the cam device in the radial direction and therefore receives the deviation movements from the cam device on the same basis as they were applied to the cam device.

In the foregoing arrangements, the workholder A has been stationary, except for its rotation about its own axis, and both the traversing movement (whether translational when the basic surface is plane or effectively rotational when the basic surface is spherical) and the correcting movement in accordance with the deviations, have been applied to the toolholder D, such arrangements operating in the case of a plane basic surface on a rectangular system of coordinates and in the case of a spherical basic surface on a combined polar and rectangular system of coordinates. It will be appreciated, however, that various inversions of such movements can be used instead, if desired.

Thus, for example, the correcting movement could be applied to the workholder A, by mounting the support for the horizontal spindle $A^1$ on an axially moving carriage, whilst the traversing movement remains applied to the toolholder D, the toolholder still being mounted on the cross-slide E on the carriage when the basic surface is spherical (a fixed abutment being provided for the arcuate guide R), or being mounted on a simple transverse carriage when the basic surface is plane.

Or again, the traversing movement and the correcting movement could both be applied to the workholder A, by mounting the support for the horizontal spindle $A^1$ on the cross-slide E on the carriage F, the toolholder D being fixed in position on the base.

In another variant, the traversing movement is applied to the workholder A and the correcting movement to the toolholder D. In the case of a plane basic surface, this is effected by mounting the toolholder D on an axially moving carriage and the support for the horizontal spindle $A^1$ on a transversely moving carriage. In the case of a spherical basic surface, however, the support for the horizontal spindle $A^1$ is mounted on the cross-slide E on the axially moving carriage F (with a fixed abutment for the arcuate guide R), whilst the toolholder D is mounted on another axially moving carriage.

Again, in the case of a spherical basic surface, it is also possible to split up the two coordinate components of the traversing movement and apply one to the workholder A and the other to the toolholder D. This can be achieved, for example, by mounting the support for the accurate spindle $A^1$ on an axially moving carriage, such carriage also carrying the arcuate guide R with which cooperates an abutment fixed to a transversely moving carriage, such latter carriage carrying an axially moving cross-slide which is moved by the lever G in accordance with the correcting movement and carries the toolholder D.

The various alternative arrangements can also be modified in other ways within the scope of the invention. For example, it is not essential to the invention for the horizontal table H, which carries the cam device, to rotate about a pivot axis, and such table could, if desired, perform a straight-line translational movement, appropriately interrelated to the relative traversing movement between the tool $D^1$ and the workpiece C. In such case, the cam device (whether in the form of a mechanical cam or of an optical cam device) would take the form of a curve differing from a straight line (instead of a circle) in accordance with the deviations of the desired surface from the basic surface. The step-by-step movement of the table during generation of the cam device would of course take place along exactly the same path as its subsequent movement during manufacture of the desired surface.

What we claim as our invention and desire to secure by Letters Patent is:

1. Apparatus for producing on a workpiece by means of a tool a surface of revolution which deviates from a basic surface by relatively small amounts at different radial distances from the axis of symmetry, said apparatus comprising a fixed base, a workholder for carrying the workpiece, means for rotating the workholder about an axis constituting the said axis of symmetry, a toolholder for carrying the tool in operative relationship to the workpiece on the workholder, mounting means on the base for locating the workholder and toolholder relatively to a fixed reference axis which coincides with the axis of rotation of the workholder in at least one position thereof, superimposed slideways for confining component relative movements between the workholder and the toolholder to two coordinate directions respectively parallel to and at right angles to the fixed reference axis, means for applying to the workholder and the toolholder a resultant relative traversing movement in accordance with the shape of the basic surface under the control of such slideways, and means for superimposing on such traversing movement a relative correcting movement in the direction of the fixed reference axis in accordance with the deviations of the desired surface from such basic surface.

2. Apparatus as claimed in claim 1, wherein the basic surface consists of a plane surface at right angles to the axis of symmetry, and in which the relative traversing movement is effected in a direction at right angles to the axis of symmetry.

3. Apparatus as claimed in claim 2, including a cam device shaped in accordance with the deviations of the desired surface from the basic plane surface, transmission means through which the cam device controls the relative correcting movement, and means for effecting relative movement between the cam device and the transmission means in accordance with the relative traversing movement between the workholder and the toolholder.

4. Apparatus as claimed in claim 3, in which the shape of the cam device is determined in accordance with a chosen large multiple of the said deviations, and the transmission means has a reduction ratio dependent on such chosen multiple.

5. Apparatus as claimed in claim 4, in which the cam device consists of an optical cam device comprising a sheet bearing a curved line which contrasts in respect of light-transmitting properties with the background constituted by the adjacent portions of the sheet, and the transmission means includes an optical unit cooperating with the cam device and follower means for causing the optical unit to follow the curved line on the sheet during the relative traversing movement.

6. Apparatus as claimed in claim 5, in which the optical unit includes a source of light, means for directing a small beam of light from the source through the optical cam device, and photoelectric means responsive to lateral displacement between the beam of light and the curved line on the sheet, and the follower means comprises a reversible electric motor, electrical circuit means for controlling the direction of rotation of such motor in accordance with the output of the photoelectric means, and means whereby the electric motor causes relative movement between the optical cam device and the optical unit for correcting the said lateral displacement, such relative movement consisting of small oscillations from one side to the other of the correct relative position determined by the optical cam device.

7. Apparatus as claimed in claim 1, wherein the basic surface consists of a spherical surface centered on the axis of symmetry, and in which the means for applying the relative traversing movement includes guiding means for interrelating the two component rectangular coordinate relative traversing movements to produce a resultant relative traversing movement equivalent to a rotation about a pivot axis intersecting the axis of symmetry at right angles at a radius equal to that of the basic spherical surface.

8. Apparatus as claimed in claim 7, in which the means for superimposing the relative correcting movement on the relative traversing movement comprises an optical cam device consisting of a sheet bearing a curved line which contrasts in respect of light-transmitting properties with the background constituting the adjacent portions of the sheet and is shaped in accordance with the deviations of the desired surface from the basic spherical surface, an optical unit cooperating with the optical cam device, means for effecting relative movement between the optical unit and the optical cam device in accordance with the relative traversing movement between the workholder and the toolholder, follower means acting during such relative movement to cause the optical unit and the optical cam device to perform relative working movements transverse to such relative movement whereby the optical unit is caused to follow the curved line on the sheet, and transmission means through which the said relative working movements are caused to control the relative correcting movement between the workholder and the toolholder.

9. Apparatus as claimed in claim 8, in which the shape of the cam device is determined in accordance with a chosen large multiple of the said deviations, and the transmission means has a reduction ratio dependent on such chosen multiple.

10. Apparatus as claimed in claim 8, in which the optical unit comprises a source of light, means for directing a small beam of light from the source through the optical cam device, and photoelectric means responsive to lateral displacement between the beam of light and the curved line on the sheet for giving an output for the control of the follower means.

11. Apparatus as claimed in claim 10, in which the follower means comprises a reversible electric motor, electrical circuit means for controlling the direction of rotation of such motor in accordance with the output of the photoelectric means, and means whereby the electric motor acts to cause the relative working movements between the optical unit and the optical cam device, such relative working movements consisting of small oscillations from one side to the other of the correct position determined by the optical cam device.

12. Apparatus as claimed in claim 7, in which the guiding means comprises two cooperating guide members consisting respectively of an arcuate guide shaped to suit the shape of the basic spherical surface and an abutment cooperating with such arcuate guide, means for mounting one of such two cooperating guide members on the superimposed slideways, and means whereby the correcting movement is applied to the other of such cooperating guide members and is thereby superimposed on the relative traversing movement.

13. Apparatus as claimed in claim 12, in which the means for superimposing the relative correcting movement on the relative traversing movement comprises a cam device shaped in accordance with the deviations of the desired surface from the basic spherical surface, an element cooperating with such cam device, means for effecting relative movement between the cam device and such element in accordance with the relative traversing movement between the workholder and the toolholder whereby the said element is caused to perform working movements transverse to such relative movement dependent on the shape of the cam device, and transmission means through which the working movements of the said element are transmitted to the one of the two said cooperating guide members to which the correcting movement is applied.

14. Apparatus as claimed in claim 13, in which the shape of the cam device is determined in accordance with a chosen large multiple of the said deviations, and the transmission means has a reduction ratio dependent on such chosen multiple.

References Cited in the file of this patent
UNITED STATES PATENTS

| | | |
|---|---|---|
| 1,485,258 | Dzus | Feb. 26, 1924 |
| 2,725,776 | Hopkins | Dec. 6, 1955 |
| 2,733,510 | Darogo | Feb. 7, 1956 |